United States Patent [19]

Breimesser

[11] Patent Number: 4,896,525

[45] Date of Patent: Jan. 30, 1990

[54] METHOD FOR A SELF-MONITORING TRANSDUCER

[75] Inventor: Fritz Breimesser, Nuremberg, Fed. Rep. of Germany

[73] Assignee: Siemens Aktiengesellschaft, Berlin & Munich, Fed. Rep. of Germany

[21] Appl. No.: 300,704

[22] Filed: Jan. 23, 1989

Related U.S. Application Data

[63] Continuation of Ser. No. 159,316, Feb. 23, 1988, abandoned.

[30] Foreign Application Priority Data

Feb. 24, 1987 [DE] Fed. Rep. of Germany ....... 3705900

[51] Int. Cl.[4] .............................................. G01L 27/00
[52] U.S. Cl. ........................................ 73/1 R; 73/4 R
[58] Field of Search ................ 73/1 R, 1 B, 1 C, 4 R, 73/1 H; 324/202; 374/1

[56] References Cited

U.S. PATENT DOCUMENTS

| | | | |
|---|---|---|---|
| 3,657,926 | 4/1972 | Munson et al. | 374/1 |
| 4,610,256 | 9/1986 | Wallace | 73/4 R |
| 4,692,696 | 9/1987 | Bray | 324/202 |

FOREIGN PATENT DOCUMENTS 2437438 2/1976 Fed. Rep. of Germany .

OTHER PUBLICATIONS

VDI Berichte, No. 566 (1985) pp. 361-362 (no translation).

Paper by R. K. Chohan, et al. "Understanding the Dynamic Response of Industrial Temperatures Sensors: An Approach Based on Mathematical Models", Tavistock (1983), pp. 1-10.

Primary Examiner—Robert R. Raevis
Attorney, Agent, or Firm—Kenyon & Kenyon

[57] ABSTRACT

A method for the self monitoring transducer in which approximate calibration of the transducer does not require physical disconnection of the measuring chain so that the transducer need not be uncoupled to be measured. The method permits monitoring the transducer during its operation by modulating at least one predetermined quantity $h_i$ with a suitable actor. The measuring signal associated with the individual modulation quantities are used to monitor and calibrate the transducer.

4 Claims, 2 Drawing Sheets

METHOD FOR A SELF-MONITORING TRANSDUCER

This application is a continuation of application Serial No. 07/159,316, filed 23 Feb. 1988, now abandoned.

BACKGROUND OF THE INVENTION

1. Field of the Invention

The invention relates to a method for transducer self monitoring.

II. Description of Related Art

Transducers or sensors are used increasingly extent to control and regulate physical variables in modern measuring and automatization applications. These transducers convert quantities such as pressure or temperature into an electrical signal, for example, that subsequent electronics process further. The demand for transducers and subsequent signal processing systems has created a need for the transducer to detect its own malfunctioning so as to reduce its effect. The transducer can, for example, malfunction by changing its sensitivity or zero point. An important source of error, however, can come at the coupling of the transducer to the physical variable. Therefore, monitoring the entire measuring chain from the transducer to the subsequent signal processing system is more effective when done closer to the beginning of the measuring chain.

From DE-AS 2,437,438, for example, is known a method for increasing the accuracy of an analog measuring processes. At least two precisely known calibration values are applied in succession at the input of an analog measuring chain. The measuring chain connects the inputs toa digital system where they are stored in digital form. The transmission properties of the entire analog measuring chain can be determined using these calibration values received at the input of the transducer of the measuring chain. These values preferentially have the form of the physical variable to be measured. This permits the precise assignment of defined physical values to the digital measuring signals stored in the measuring process. At least two calibration values are applied at the input of the measuring chain. One calibration value preferably corresponds to the non-loaded state and the other to the end scale deflection of the transducer. In addition, provisions are made for storing several calibration values to aid in detecting errors in linearity.

However, this method requires physically disconnecting the measuring chain at the input of the transducer. The disconnection interrupts the coupling of the variable to the input of the transducer. As a result, a physically equivalent calibration value must be applied at the input of the transducer rather than as the physical variable to be measured.

A physically disconnected measuring chain is, for example, known from "VDI-Bericht No. 566, Automatische Messysteme, VDI Verlag, Dusseldorf, 1985". On pages 361 and 362 of this article is disclosed an inductive relative path sensor which is supplemented by a calibration addition. The magnetic core of the inductive sensor is supported on axis in the probe tip so as to be displacable. During a measurement the magnetic core is normally fixed relative to the probe tip by a permanent magnet. The magnetic coil is excited for calibration and the magnetic core is pulled to a stop on axis. The known displacement path supplies a jump signal to the measuring chain which indicates the transmission factor in mV/mm as long as the transducer has a linear response.

However, the physical separation of the measuring chain caused by uncoupling the transducer from the physical variable to be measured makes for a more difficult measurement. In addition, the coupling of the tranducer to the physical variable cannot be monitored during the calibration process because the actual physical variable to be measured cannot be accessed.

R. K. Chohan and F. Abdullah disclose in Transducer Tempcom Conf. Papers, tavistock 1983, pages 1 to 10, a method for self monitoring a temperature sensor in which the coupling of the sensor to the physical variable to be measured is maintained during the monitoring process. Briefly increasing the current through the temperature sensor to a multiple of the normal value causes the temperature sensor to be locally heated so that the dynamic response of the measured signal conveys information regarding the sensor and its thermal coupling to the medium being measured. Quantitative determination of the sensitivity of the sensor is, however, not possible with this method because the response to the measuring signal over time is such that the information regarding the sensitivity of the sensor cannot be separated from the information regarding the thermal contact of the sensor with the surrounding medium.

SUMMARY OF THE INVENTION

The present invention relates to a method for transducer self monitoring in which the transducers are not physically disconnected so as to produce a closer approximate quantitative calibration. The characteristic of the transducer in the vicinity of the true value of the physical variable is examined during operation of the transducer by modulating the physical variable being sensed. Adding an additional modulation step can determine the slope of the characteristic. The slope indicates the sensitivity of the transducer if the measurement of the nonmodulated variable is counted as being the first modulation step. In many instances this information is enough to determine the reliability of the measured values. For a transducer having a linear response, for example, the slope of the characteristic can be determined quantitatively with one modulation step.

In one embodiment of the invention, the mathematical form of the characteristic is known except for the parameters. This method determines the true value of the variable as well as the parameters of the characteristic by modulating the physical variable. Consequently, the characteristic of the transducer can be determined during dynamic operation so that physical separation from the measuring chain is not required. The number of requisite modulation steps is determined by the number of parameters necessary to specify the characteristic of the transducer. A precondition for the feasibility of the method here is that the error sources leave the fundamental mathematical structure of the characteristic unchanged.

One particularly advantageous method has the modulation take place symmetrically, for example, in the form of an oscillation or several time-sequenced oscillations with different amplitudes around the value of the variable.

DETAILED DESCRIPTION

Figure 1:
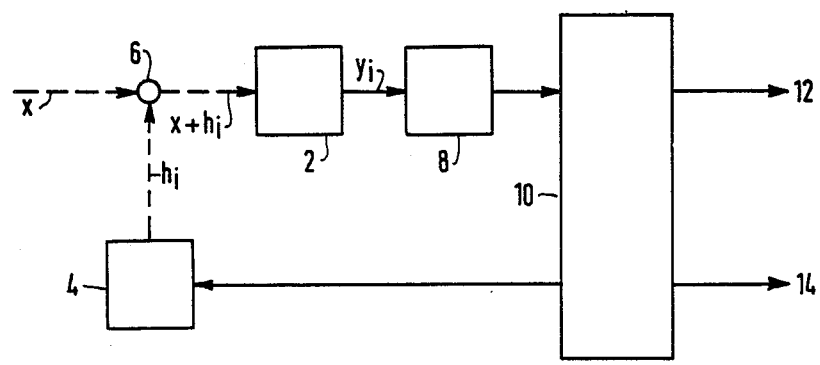
FIG. 1 shows the method according to the invention as a block diagram.

FIG. 1 shows a transducer 2 for detecting the value $x_o$ of a variable actor 4. Superimposed additively on the variable $x_o$ at a superimposition site 6 is a modulation variable $h_i$. This superimposition site 6 is located at the input of transducer 2. Transducer 2 converts the modulated variable resulting from the additive superimposition, having a value $x + h_i$, into a measurement signal $Y_i$. The measurement signal has, for example, the form of an electric signal such as an analog voltage that is digitized in an analog to digital converter 8 subsequently and supplied to an evaluation and control unit. The evaluation and control unit 10 performs the required mathematical evaluation of the measured signals and makes available control signals for actor 4. The control signals regulate the progression of the time of the required modulation steps and the associated modulation amplitudes. The evaluating and control unit 10 is additionally provided with an analog or digital output 12 for representing the measured value x and additional outputs 14 for the status signals to indicate the operating state of transducer 2.

Figure 2:
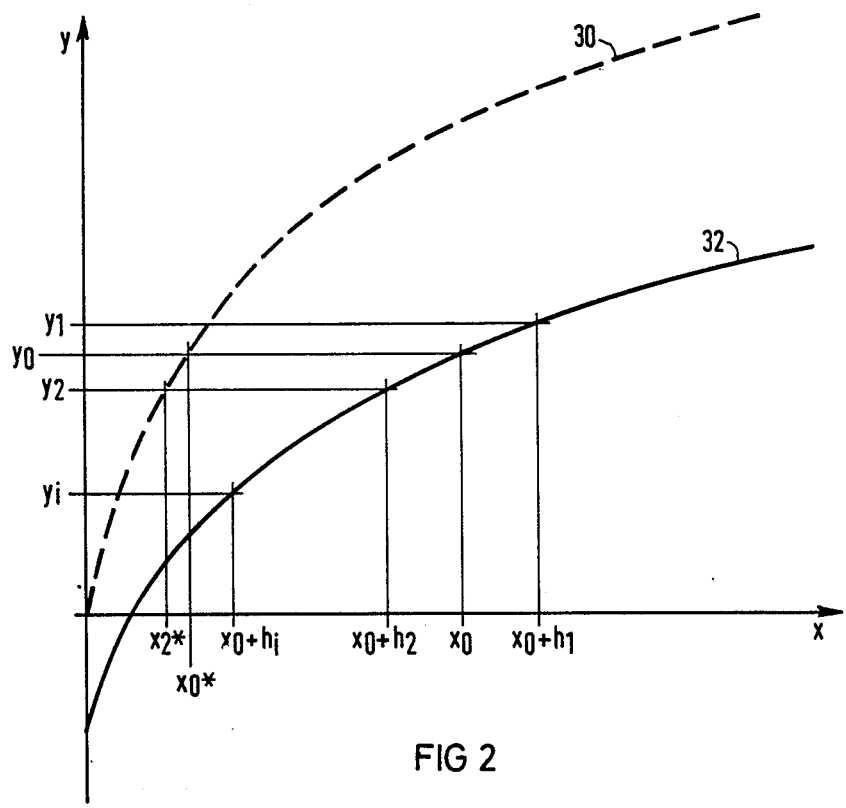
FIG. 2 shows two exemplary characteristic curves for a transducer under different operating conditions.

FIG. 2 show the measured signal Y at the output of a transducer plotted against a variable x which corresponds to a possible value of the physical variable. The variable can, for example, be a mechanical variable such as pressure, an optical variable such as photo intensity, or an electrical variable such as magnetic field. FIG. 2 shows two characteristics 30 and 32. For example, characteristic 30 is developed in the course of calibrating the transducer. Characteristic 32 represents the actual characteristic of the transducer produced by operating through zero drift and sensitivity changes. The true value $x_o$ of the variable x at the transducer produces the measured signal $y_o$ at the output of the transducer. If the characteristic 30 is taken as the base in determining x, then measuring signal $y_o$ corresponds to a value $x_o^* \neq x_o$.

The response to the transducer in the environment of $x_o$ is investigated by additively superimposing and sequencing in time a known quantity $h_2$ to determine a corresponding measured signal as shown in FIG. 2. The difference $x_2^* - x_o$ is determined by characteristic 30 and does not agree with the true difference $x_o + h_2 - x_o = h_2$ since characteristic 30 in the range around $Y_o$ has a steeper slope than characteristic 32. This information is already sufficient to identify a malfunction in the transducer. For a transducer having a linear characteristic, the sensitivity obtained using the measured value of the unmodulated variable can be determined in one modulation step. If additional information regarding the position zero is available, then the true linear characteristic can be completely reproduced. Complete reproduction of the true characteristic of a transducer through modulation of only the physical variable is, however, possible only if characteristics 30 and 32 fulfill certain preconditions. Assuming that the characteristics 30 and 32 can be described by a common mathematical function $y = f(a_j, x)$ and that the different characteristics each have different sets of parameter $a_j$ assigned to them, then each modulation of the true value $x_o$ of the variable by the quantity $h_i$ leads to an equation of the form $$y_i = f(a_j, x_o + h_i).$$

This produces a set of equations $$g_0(a_j, x_0) = f(a_j, x_0 + h_0) - y_0 = 0$$

$$g_1(a_j, x_0) = f(a_j, x_0 + h_1) - y_1 = 0$$

$$\vdots$$

$$g_{n-1}(a_j, x_0) = f(a_j, x_0 + h_{n-1}) - y_{n-1} = 0$$

The unknown variables in this system of equations are the parameters $a_j$ and the true value $x_o$ of the variable. In order to solve the set, the number n of the equations of this system of equations must be greater by 1 than the number of the parameters $a_j$. The parameters $a_j$ are the variable parameters needed to describe the characteristic. If, for example, the transducer has a linear characteristic and the position of zero, $a_o$, is known, then the characteristic function $f(a_j, x) = a_o + a_1 x$ contains only one variable parameter $a_j$ corresponding to the slope $a_1$ of the characteristic. Solving the set of equations requires at least n measuring steps with n different modulation quantities $h_o, h_1, \ldots h_{n-1}$. It is advantageous to make $h_o = 0$ and to carry out the modulation of the variable in the form of a symmetric oscillation around $x_o$. Two quantities $h_{i,1}$ and $h_{i,2}$ correspond to a given oscillation amplitude and differ solely in the sign $|h_{i,1}| = |h_{i,2}|$.

The equation system $g_i(a_j, x_o + h_i)$ has a definite solution if for the associated functional determinant if the following relationship is fulfilled.

$$\frac{D(g_i)}{D(a_j, x_0)} = \begin{vmatrix} \frac{\partial g_0}{\partial a_0} & \frac{\partial g_0}{\partial a_1} & \frac{\partial g_0}{\partial a_{n-2}} & \frac{\partial g_0}{\partial x_0} \\ \frac{\partial g_1}{\partial a_0} & & & \\ \vdots & & & \vdots \\ \frac{\partial g_{n-1}}{\partial a_0} & \cdot & \cdot & \frac{\partial g_{n-1}}{\partial x_0} \end{vmatrix} \neq 0$$

The condition determines that not all characteristic functions $y = f(a_j, x)$ lead to a solvable set of equations $g_i(a_j, x_o)$. For example, the linear characteristic function $y = a_o + a_1 x$ for the two unknown parameters $a_o$ and $a_1$ does not fulfil this condition. The functional determinant associated with this characteristic vanishes.

$$\frac{D(g_0, g_1, g_2)}{D(a_0, a_1, x_0)} = \begin{vmatrix} 1 & x_0 + h_0 & a_1 \\ 1 & x_0 + h_1 & a_1 \\ 1 & x_0 + h_2 & a_1 \end{vmatrix} = 0.$$

Therefore, in this case the parameters $a_o$ and $a_1$ as well as the true value $x_o$ of the variable cannot be determined together. However, the sensitivity $a_1$ of the sensor can be calculated using two modulation steps. Zero drift is reflected in the parameter $a_o$. Consequently, nothing can be said regarding the true value of x. If, for example, the parameter $a_o$ is known from proceding measuring intervals, the number of unknown parameters is reduced by one and the underlying set of equation leads to a non-vanishing functional determinant $$\frac{D(g_0, g_1)}{D(a_1, x_0)} = \begin{vmatrix} x_0 + h_0 & a_1 \\ x_0 + h_1 & a_1 \end{vmatrix} \neq 0$$

A transducer with a characteristic given by $y = a_o + a_j x + a_2 x^2$ is not suitable for carrying out the method because the functional determinant associated with its characteristic has three unknown parameters and also vanishes. Suitable sensor characteristics, however, are given by, for example, the functions $y = a_o + a_2 x^2$ $y = a_o + a_1 x + a_2 x$ $y = a_o + a_2/x$ Consequently, the method of the present invention requires a transducer that has a characteristic that can be represented by a function $y = f(a_j, x)$ that produces a set of equations $g_i(a_j, x_o)$ with the unknowns $a_j, x_o$ that have a functional determinant that does not vanish. The requirement of the characteristic of the transducer assumes that those parts of its characteristic function which, in the strict mathematical sense, could lead to unsolvability of the set of equations $g_i$ are either known or are negligible when compared to the other components.

For a transducer having a characteristic that can be described with a quadratic function $y = a_o + a_1 x + a_2 x^2$, either the linear component $a_1 x$ compared to the pure quadratic component $a_o + a_2 x^2$ can be neglected or can be assumed to be known and have an unchanged parameter $a_1$. A further assumption of the method is that the function form of the characteristic of the transducer does change during operation. Thus, for example, zero drift and sensitivity changes of the transducer is only expressed as a change of the parameter set $a_j$. The functional form typically used to solve the associated set of equations is stored in the evaluation and control unit 10 shown in FIG. 1. The equation for the transducer can take the form of a suitable algorithm that is executed by a microprocessor in control unit 10.

Figure 3:
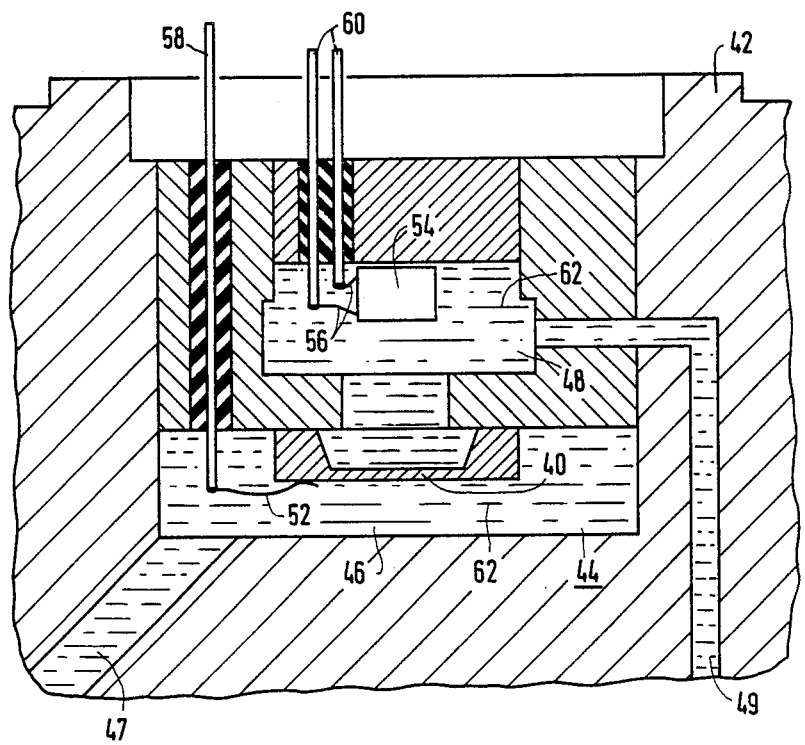
FIG. 3 an embodiment of a transducer for pressure measurements suitable for the use with the present invention.

The embodiment according to FIG. 3 involves a piezoelectric differential pressure sensor having a diaphragm 40. The diaphragm is arranged in a casing 42 of the pressure sensor that divides a hollow interior space 44 of the casing into a pressure chamber 46 and a reference chamber 48. Pressure chamber 46 and reference chamber 48 are tightly sealed against each other. The pressure chamber 46 and the reference chamber 48 each have pressure channels 47, 49 that, for example, indirectly connect the measuring medium with a receiving diaphragm. The pressure chamber 46, the reference chamber 48 and the associated pressure channels 47, 49 are filled to the receiving diaphram with an at least approximately incompressible medium 62 such as silicon fluid. Diaphram 40 preferably comprises silicium and is, for example, provided with a piezoelectric resistance bridge that receives voltage or current through electrical connections 52. In addition, the reference chamber 48 encloses a piezoelectric element 54 that has electrical connections 56. The electric connection 52 and 56 are sealed gas tight and led out of the reference chamber 48 with electric lead throughs 58, 60. The piezoelectric element 54 comprises, for example, of a piezoelectric ceramic. Piezoelectric element 54 comprises, for example, an area of approximately 10 mm² and a thickness of approximately 1 mm to yield at excitation voltage of, for example, approximately 100 V at a hydrostatic blocking force of approximately 30 N. The corresponding pressure increase in the reference chamber is then approximately $3 \times 10^6$ Pa. This hydrostatic pressure increase in the reference chamber 48 will result if the pressure compensation across the receiving diaphragm adjoining the pressure channel 49 and can be neglected for rapid modulating. The measuring range of the transducer is constructed to operate in the non-linear range of its characteristic.

What is claimed is:

1. A method for self-monitoring a transducer to measure a true value $x_o$ of a physical variable with the transducer, comprising the steps of:
   (a) modulating said physical variable by predetermined quantities $h_i$, at least one of the quantities $h_i$ being nonzero;
   (b) generating measuring signals $y_i$ from said modulated physical variable; and
   (c) determining the true value $x_o$ for said physical variable from said measuring signals $y_i$; wherein
   the transducer is operated in a measuring range which has a characteristic that is at least approximately represented by a function $y = f(a_j, x)$, where x refers to a possible value of the physical variable and $a_j$ to unknown parameters;
   said measuring signals $y_i$ and each associated $h_i$ give a set of n equations $g_i(a_j, x_o) = f(a_j, x_o + h_i) - y_i = 0$ the set of n equations being greater by one than the number of the unknown parameters $a_j$, the set of n equations having a functional determinant $$\frac{D(a_i)}{D(a_j, x_o)} \quad \frac{D(g_i)}{D(a_j, x_o)} \neq 0; \text{ and}$$

said true value $x_o$ of said physical variable is determined by solving said set of equations for $x_o$.

2. A method as claimed in claim 1, wherein said modulation is carried out as a symmetric oscillation.

3. A method as claimed in claim 1, further comprising the step of deriving an equation $g_o(a_j, x_o)$ of said set of equations $g_i(a_j, x_o)$ by measuring an unmodulated variable.

4. A method for self-monitoring a transducer to measure a true value $x_o$ of a physical variable with the transducer, comprising the steps of:
   (a) modulating said physical variable by predetermined quantities $h_i$, at least one of the quantities $h_i$ being nonzero;
   (b) generating measuring signals $y_i$ from said modulated physical variable; and
   (c) determining the true value $x_o$ for said physical variable from said measuring signals $y_i$.

* * * * *